July 22, 1969    J. P. CODY ET AL    3,456,910
PORTABLE IMPACT PAD

Filed July 17, 1967    3 Sheets-Sheet 1

INVENTOR.
JOSEPH P. CODY
DALE W. WALKER
BY
Arthur L. Collins
ATTORNEY

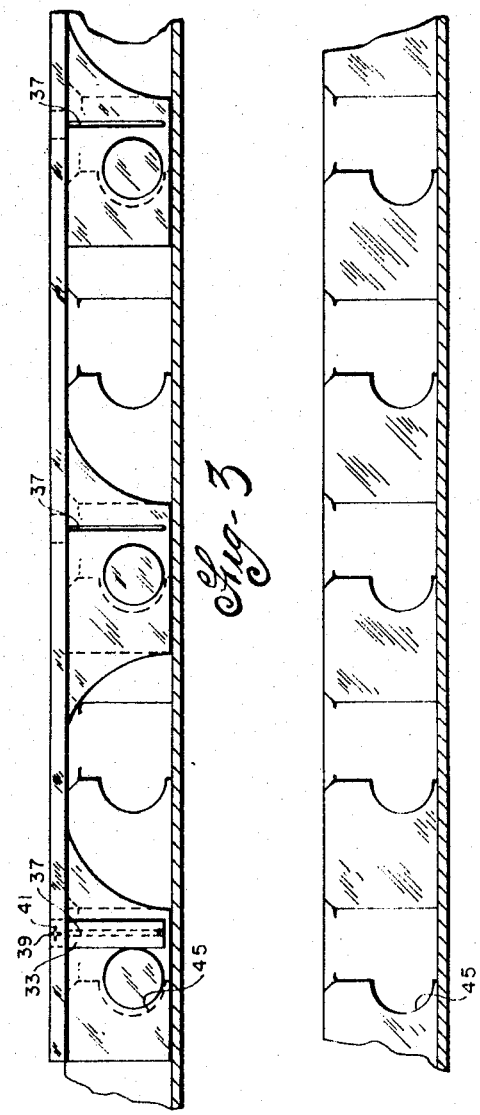

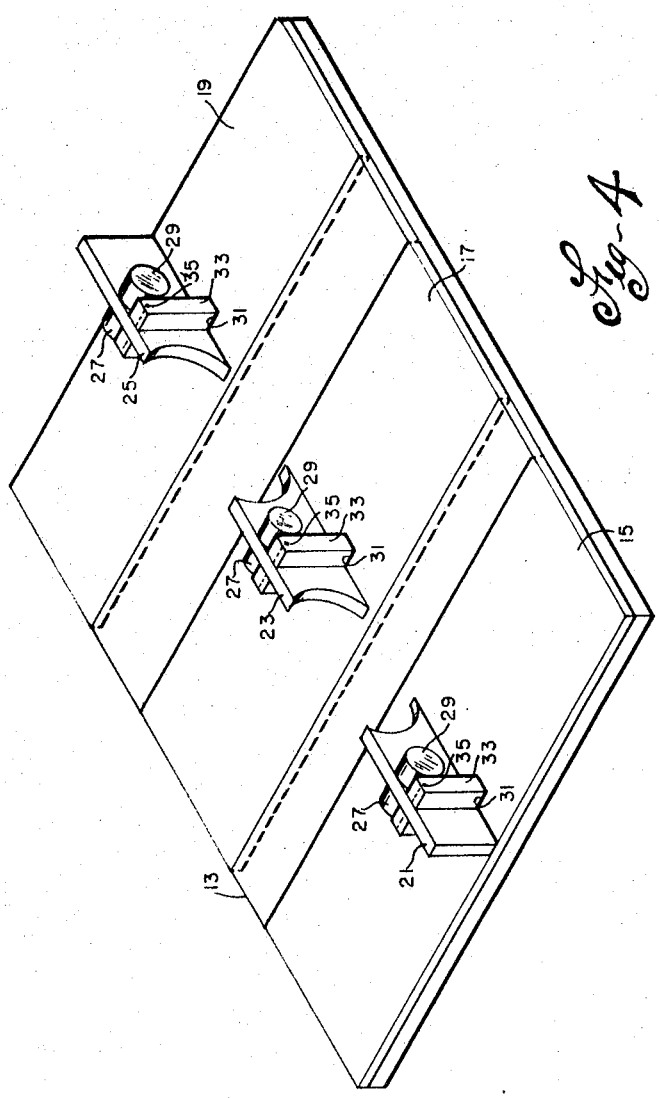

United States Patent Office 3,456,910
Patented July 22, 1969

3,456,910
PORTABLE IMPACT PAD
Joseph P. Cody, Cheltenham, and Dale W. Walker, Media, Pa., assignors to the United States of America as represented by the Secretary of the Navy
Filed July 17, 1967, Ser. No. 654,013
Int. Cl. B64f 1/04
U.S. Cl. 244—114                    6 Claims

ABSTRACT OF THE DISCLOSURE

The subject disclosure relates to a novel and improved shock absorbing pad which is removably locked in place on the flight deck of an aircraft carrier to protect the deck from the impact of aircraft holdback apparatus during a launching operation. The pad includes an enlarged planar surface portion that is positioned on the area of the deck to be protected and a plurality of aligned rib portions that extend downwardly and perpendicularly into a series of cleats imbedded in the deck that provide an anchor for the aircraft holdback apparatus. Cylindrical bosses extend outwardly from opposite sides of each rib and engage the conventional internal curvilinear contours of the deck cleats. U-shaped members slidably move up and down on opposite sides of each rib and lock or unlock the bosses in the cylindrical concavities of the deck cleats.

---

On aircraft carriers and other limited area aircraft launching surfaces, a series of internally formed deck cleats spaced along an elongated slot in the launching surface are often commonly used to anchor one end of a conventional aircraft holdback device prior to a launch. These deck cleats are generally highly susceptible to peening damage when repeatedly impacted by the heavy components of the holdback assembly on rupture of the frangible section of the holdback assembly during the launching operation. Although various types of semi-permanent protective pads have been bolted and otherwise secured to the launching surface in the past to protect the deck from such impact damage, considerable difficulty has been experienced heretofore in designing a pad which is readily handled, easily installed or removed, and relatively inexpensive to fabricate.

It it is therefore a principal object of the invention to provide a novel and improved deck area impact pad which is portable and easily secured to the holdback area deck cleats which are to be protected.

It is a further object of the invention to provide a novel and improved impact pad for a launching surface which is secured thereto by means of a plurality of unique locking devices.

It is a further object of the invention to provide a novel and improved aircraft launching area pad which can readily be used to protect preselected portions of the launching area with minimum interference with deck lighting systems and other deck fixtures and fittings.

Other objects and many of the attendant advantages of this invention will be readily appreciated as the same becomes better understood by reference to the following detailed description when considered in connection with the accompanying drawings wherein:

FIG. 2 is a cross-sectional view of the series of deck cleats along the slot in the launching area shown in FIG. 1;

Figure 1:
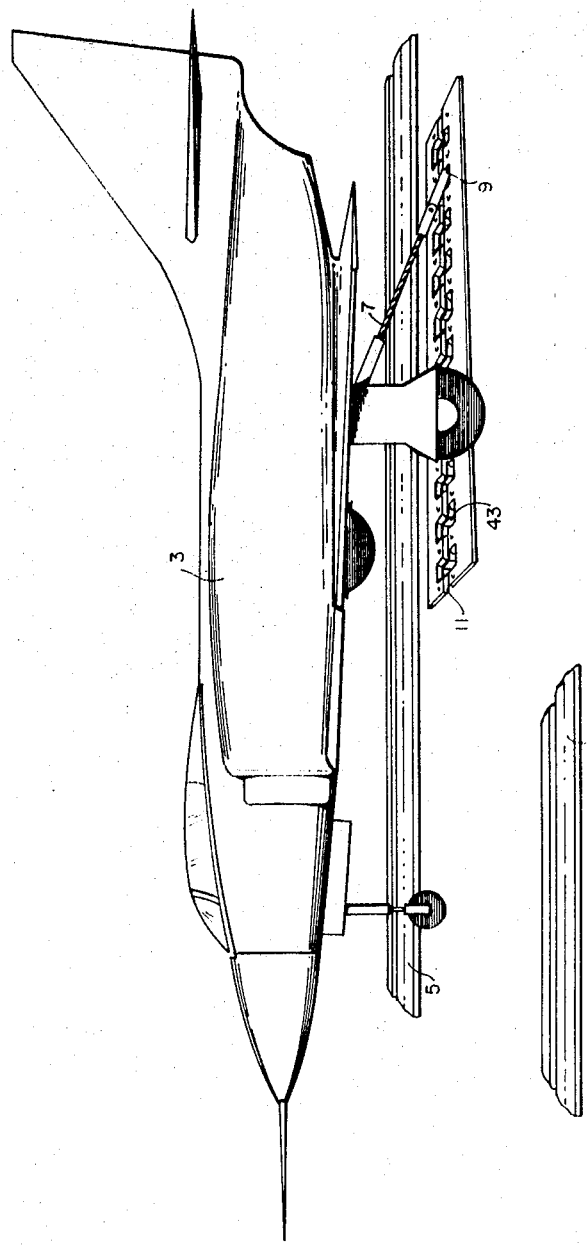
FIG. 1 is a perspective view of an aircraft on an unprotected launching area and its holdback mechanism prior to the launching operation.

FIG. 3 is a cross-sectional view of the series of deck cleats shown in FIG. 2 together with the improved protective pad of the invention wherein one pad locking device engages the cylindrical bosses of the pad and locks the pad in place on the launching area and wherein the other locking devices are omitted; and FIG. 4 is a perspective bottom view of the improved protective pad of the invention with each of the locking devices fully inserted into their pad locking positions.

Referring now to the various figures of the drawing, it will be noted that the aircraft 3 is positioned on the runway adjacent the bridle arrester track 5 and is restrained from its launch by the conventional aircraft holdback device 7. One end of the holdback device 7 engages a suitable link or hook mechanism on the aircraft and its other end is seated in one of the conventional sereis of cleats 9 along the slot 11 in the launching surface. Side edges of the pad 13 are molded to follow the contour of the adjacent inner peripheral surfaces of the bridle arrester tracks 5. The relatively thin metal plates 15, 17 and 19 are molded into the pad 13 across its width to increase its rigidity and minimize flutter of the pad during the aircraft take-off operation. The three ribs 21, 23 and 25 are integrally attached to the bottom of the pad 13 along its longitudinal centerline and extend downwardly therefrom. The cylindrical bosses 27 and 29 extend outwardly as shown from opposite sides of each rib and as will be more apparent hereinafter engage the opposed cylindrical pockets in the deck cleats 9 when the pad 13 occupies its deck protecting position on the launching surface. The rectangular apertures 31 are formed in the pad 13 and extend perpendicularly beneath the ribs 21, 23 and 25. The pad locking devices 33 are generally U-shaped members which when fully inserted into the pad 13 engage the peripheral surface of the cylindrical bosses 27 and 29 and lock the pad in place on the launching surface. The upper surface of the pad 13 is suitably inset to receive the closed end of each locking device 33 so as to provide a smooth continuous exterior surface when the pad is locked in its deck protecting position on the launching surface. Opposite ends of the spring pin 35 are embedded in the juxtaposed ends of the legs of each U-shaped locking device 33 and pass through the slot 37 in the locking device 33. The slot 37 is preferably slightly tapered such that when the locking device 33 is fully withdrawn, the peripheral surfaces of the pins 35 frictionally engage the rib and hold the locking device in its unlocked position while the pad 13 is being positioned on the launching surface. The closed end of each U-shaped locking device 33 includes at least one aperture 39 with a pin 41 which extends across the aperture and is embedded in opposite sides of the locking device. As will be more apparent hereinafter, in this way, means for ready removal of the locking device from the deck cleat is provided.

In operation, when the impact pads 13 are to be locked in position on the launching surface to protect its various deck cleats 9, the locking devices 33 are first fully withdrawn from the pad 13. The pad 13 is then placed on the launching surface between parallel sections of the bridle arrester tracks 5 such that its ribs 21 project downwardly into the deck slot 11. The cylindrical bosses 27 and 29 on the ribs 21, 23 and 25 simultaneously enter the enlarged deck cleat apertures 43 in the launching surface. The entire pad assembly is then moved forwardly so that the cylindrical rib bosses 27 and 29 enter the cylindrical deck cleat cavities 45. The locking devices 33 are then fully inserted into the pad 13 and deck cleat apertures 43 so that the cylindrical bosses 27 and 29 are locked in the deck cleat cavities 45 and the entire impact pad 13 is locked in place on the launching surface. Any desired number of portable impact pads 13 may be similarly locked in position side by side beneath the aircraft 3 between the parallel bridle arrester tracks 5. When the frangible section of the holdback device 7 parts and the aircraft launching operation begins, impact of the portion of the holdback device secured to the launching surface is cushioned by the polyurethane pad 13 and damage to the deck as well as the underside of the aircraft 3 is minimized. When the portable impact pad 13 is to be removed from the launching surface, the embedded pins 41 in the top of the U-shaped locking devices 33 are engaged by the fingers or a suitable tool and the locking devices are fully withdrawn. The pad assembly 13 is then shifted rearwardly and the pad is removed from the launching surface.

Obviously, many modifications and variations of the present invention are possible in the light of the above teachings. It is therefore to be understood that the invention may be practiced otherwise than as specifically described.

What is claimed is:

1. On an aircraft launching surface having an elongated slot with a series of deck cleats spaced therealong, a device for protecting the slot and the deck cleats from impact damage comprising:
   (a) a portable rectangular polyurethane impact pad;
   (b) a plurality of aligned ribs which are integrally secured to the pad so as to extend downwardly and perpendicularly from the plane of the pad;
   (c) a pair of cylindrical bosses integrally attached to opposite sides of each rib, each pair of bosses being adapted to engage a deck cleat when the pad is placed in its protective position on the launching surface with its ribs projecting downwardly into the slot;
   (d) and means for locking the protective pad in its slot and cleat engaging position on the launching surface.

2. The apparatus substantially as described in claim 1 wherein the means for locking the protective pad in its slot and cleat engaging position on the launching surface includes a U-shaped member for each rib having a pair of legs that extend downwardly through apertures in the pad on opposite sides of each associated rib, slidably engage the sides thereof, and prevent disengagement of the cylindrical bosses from the deck cleats.

3. The apparatus substantially as described in claim 2 wherein opposite ends of a pin are embedded in the juxtaposed ends of the legs of each U-shaped locking device, each said pin being disposed in a tapered slot through the width of its associated rib.

4. The apparatus substantially as described in claim 3 wherein each U-shaped locking device includes at its closed end an aperture and a second pin that is embedded in the locking device across the aperture for ready removal of the locking device when the pad is to be removed from its protective position on the launching surface.

5. The apparatus substantially as described in claim 1 wherein metal plates are molded into the ends and center of the pad to increase its rigidity.

6. The apparatus substantially as described in claim 1 wherein opposite sides of the pad are contoured so as to adjoin and mate bridle arrester tracks on opposite sides of the elongated slot.

References Cited
UNITED STATES PATENTS
2,999,431  9/1961  Mitchell _____ 94—13

FOREIGN PATENTS
962,728  7/1964  Great Britain.

FERGUS S. MIDDLETON, Primary Examiner

PAUL E. SAUBERER, Assistant Examiner

U.S. Cl. X.R.

94—13; 244—63